United States Patent [19]

Arjunan

[11] Patent Number: 5,633,321
[45] Date of Patent: May 27, 1997

[54] METHOD FOR PRODUCING COMPATIBILIZED RUBBER BLENDS OF A HYDROXY ALKYLTHIOETHENE OR HYDROXY-ALKYLAMINE FUNCTIONALIZED ISOOLEFIN/PARA-ALKYLSTYRENE COPOLYMER WITH A DISSIMILAR POLYMER

[75] Inventor: Palanisamy Arjunan, Houston, Tex.

[73] Assignee: Exxon Chemical Patents Inc., Wilmington, Del.

[21] Appl. No.: 413,039

[22] Filed: Mar. 28, 1995

Related U.S. Application Data

[62] Division of Ser. No. 43,777, Apr. 6, 1993, Pat. No. 5,461,188.

[51] Int. Cl.$^6$ ............... C08L 11/00; C08L 9/02

[52] U.S. Cl. .......... 525/197; 525/72; 525/330.7
[58] Field of Search ................. 525/187

[56] References Cited

U.S. PATENT DOCUMENTS

| | | |
|---|---|---|
| 4,678,834 | 7/1987 | Boivin ............ 525/74 |
| 5,162,445 | 11/1992 | Powers . |
| 5,334,659 | 8/1994 | Scobbo, Jr. ........ 525/71 |

Primary Examiner—Christopher Henderson
Attorney, Agent, or Firm—Frank E. Reid; Myron B. Kurtzman; C. L. Bell

[57] ABSTRACT

Method for producing a compatabilized rubber composition comprising blending a hydroxy alkylamine or a hydroxy alkylthioether functionalized polymer of a $C_4$–$C_7$ isoolein and para-alkylstyrene with a dissimilar polymer.

5 Claims, No Drawings

METHOD FOR PRODUCING COMPATIBILIZED RUBBER BLENDS OF A HYDROXY ALKYLTHIOETHENE OR HYDROXY-ALKYLAMINE FUNCTIONALIZED ISOOLEFIN/PARA-ALKYLSTYRENE COPOLYMER WITH A DISSIMILAR POLYMER

CROSS-REFERENCE TO RELATED APPLICATIONS

This application is a divisional application of U.S. Ser. No. 08/043,777, filed Apr. 6, 1993, now U.S. Pat. No. 5,461,188, issued Oct. 24, 1995.

FIELD OF THE INVENTION

The present invention relates to functionalized copolymers of an isoolefin and a para-alkylstyrene and the use of functionalized copolymers as a component or a compatibilizing component in the preparation of polymer blends.

DESCRIPTION OF RELATED ART

Copolymers of a $C_4$ to $C_7$ isoolefin, e.g., isobutylene, and up to about 20 mole % of a multiolefin such as isoprene (butyl rubber) are well known polymer materials whose vulcanizates offer some outstanding properties not possessed by many other diolefin based elastomers. Articles prepared from many cured butyl and halogenated butyl elastomers offer improved resistance to oils and greases as well as resistance to oxygen and ozone degradation. Butyl rubber vulcanizates exhibit good abrasion resistance, excellent impermeability to air, water vapor and many organic solvents, as well as resistance to aging and sunlight. These properties render these materials ideal candidates for one or more applications such as water hoses, organic fluid hoses, components in construction, gaskets, adhesive compositions and various molded articles.

More recently, a new class of halogenated elastomeric interpolymers have been discovered which offer many of the same properties as halogenated butyl rubber, but are even more ozone and solvent resistant and are more readily curable. These materials are the halogenation product of random copolymers of a $C_4$ to $C_7$ isoolefin, such as isobutylene, and a para-alkylstyrene comonomer, preferably para-methylstyrene containing at least about 80%, more preferably at least about 90% by weight of the para isomer, and wherein at least some of the alkyl substituent groups present in the styrene monomer units contain halogen. Preferred materials may be characterized as isobutylene interpolymers containing the following monomer units randomly spaced along the polymer chain:

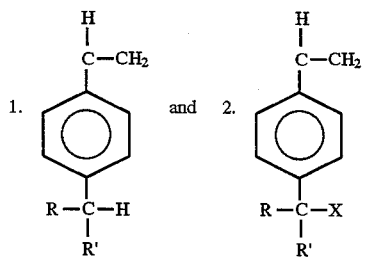

wherein R and R' are independently hydrogen, lower alkyl, preferably $C_1$ to $C_4$ alkyl and X is bromine or chlorine, and wherein the interpolymer is otherwise substantially free of ring halogen or halogen in the polymer backbone chain.

Preferably R and R' are each hydrogen. Up to about 60 mole % of the para-alkylstyrene present in the interpolymer structure may be the halogenated structure (2) above.

Most useful of such materials are elastomeric copolymers of isobutylene and para-methylstyrene containing from about 0.5 to about 20 mole % para-methylstyrene wherein up to about 60 mole % of the methyl substituent groups present on the benzyl ring contain a bromine or chlorine atom, preferably a bromine atom. These copolymers have a substantially homogeneous compositional distribution such that at least 95% by weight of the polymer has a para-alkylstyrene content within 10% of the average para-alkylstyrene content of the polymer. They are also characterized by a very narrow molecular weight distribution (Mw/Mn) of less than about 5, more preferably less than about 2.5, a preferred viscosity average molecular weight in the range of from about 300,000 up to about 2,000,000, and a preferred number average molecular weight in the range of from about 25,000 to about 500,000.

These copolymers may be prepared by slurry polymerization of the monomer mixture using a Lewis Acid catalyst, followed by halogenation, preferably bromination, in solution in the presence of halogen and a radical initiator such as heat and/or light and/or a chemical initiator.

Preferred brominated copolymers generally contain from about 0.1 to about 5 mole % of bromomethyl groups, most of which is monobromomethyl, with less than 0.05 mole % dibromomethyl substituents present in the copolymer. These copolymers, their method of preparation, their method of cure and graft or functionalized polymers derived therefrom are more particularly disclosed in U.S. Pat. No. 5,162,445, the complete disclosure of which is incorporated herein by reference.

The aromatic halomethyl groups present in such copolymers permit facile crosslinking to be accomplished in a variety of ways, including by means of zinc oxide or promoted zinc oxide curing systems normally used to cure halogenated butyl rubber.

As stated above, the superior properties of vulcanizates based on halogenated isobutylene/para-methylstyrene copolymers (hereafter referred to as HI-PMS) render them eminently suitable in applications where good heat aging, weatherability, ozone resistance, impermeability to liquids, gases and vapors, energy absorption, flex cracking resistance and chemical resistance are important. Such applications include belts and hoses for water or organic fluids, gaskets, components in barrier construction, adhesives, various molded articles, conveyor belts, air springs, and the like.

Yet another application suggested for HI-PMS is its use as a blend component with one or more dissimilar elastomers which lack one or more of these properties in order to enhance these properties in compositions containing such dissimilar elastomers and/or to impart one or more beneficial properties of the dissimilar elastomer into compositions containing HI-PMS.

For example, Neoprene (polychloroprene) rubber (CR) has been the material of choice in most power transmission belts, due to its unique combination of properties: oil resistance, toughness, dynamic flex life, good adhesion to other materials and heat resistance up to 100 degrees C. In the past, CR belts have kept pace with the needs of the automotive industry, but recently there is a need for new materials for more demanding applications. First of all, CR belts are encountering greater heat duress in service due to increasing underhood temperatures (up to 150 degrees C). Secondly, to meet automotive industry's longer warranty periods ("100,000 mile target"), the CR belts must have a lower failure rate with high mean life, even when high temperatures are not encountered. To meet these emerging needs, improvements in heat, ozone, and cut growth resistance of Neoprene belts are desirable.

Nitrile rubber (NBR) is used in automobiles because of its resistance to fuels, a variety of oils and other fluids over a wide range of temperatures. However, nitrile rubber, as such, cannot be used in specific applications requiring heat and ozone resistance. The poor ozone resistance and heat aging properties of NBR (which is a random copolymer of acrylonitrile and butadiene) are believed to be the result of unsaturation in the backbone of the polymer which permits scission of the polymer chain to occur under certain adverse conditions.

More highly unsaturated rubbers such as natural rubber, polyisoprene, polybutadiene and butadiene/styrene copolymer rubber may exhibit good properties in terms of wear resistance, flexibility, road adhesion and the like, but these materials are also subject to chemical attack and oxygen and ozone degradation, which may limit the useful lifetime of articles prepared from their vulcanizates such as tires, hoses, windshield wipers, gaskets and molded automotive components.

However, the use of HI-PMS rubber in blends with other elastomers is often limited to those other elastomers which have a mutual compatibility and comparable cure rate behavior with respect to the HI-PMS rubber. Thus, whereas highly unsaturated elastomers such as butadiene/styrene copolymers may, in some cases, be reasonably compatible with HI-PMS rubber and may be co-vulcanized because of the high availability of sites of ethylenic unsaturation, other elastomers such as polychloroprene, butadiene/acrylonitrile copolymers and like materials containing polar groups along the chain and/or a relatively low degree of ethylenic unsaturation are not so readily co-vulcanized. In the case of blends with these latter elastomers, chemical and ozone resistance may be improved due to the influence of the HI-PMS rubber, but often at the expense of a lowering of physical properties such as tensile strength, elongation, modulus and/or abrasion resistance of the co-vulcanizate as compared with the cured elastomer itself.

The role of a compatibilizer in an elastomer blend is manifold: (1) reduce the interfacial energy between the phases, (2) permit a finer dispersion during mixing, (3) provide a measure of stability against gross segregation, and (4) result in improved interfacial adhesion (G. E. Molau, in "Block Copolymers", Ed by S. L. Agarwal, Plenum, N.Y., 1970, p. 79).

Two elastomers form a compatible mixture when they have at least one of the following characteristics:

Segmental structural identity. For example, a graft or block copolymer of butadiene and styrene is compatible with either polybutadiene or polystyrene.

Miscibility or partial miscibility with each other. Solubility parameter difference <1, generally <0.2 units. For example, poly (vinyl chloride), PVC, poly (ethylacrylate), PEA, poly (methylacrylate), PMA, have solubility parameters in the 9.4–9.5 range and form compatible mixtures. Although, the structure of nitrile rubber (NBR) is entirely different from those of PVC, PMA and PEA, it has a similar solubility parameter 9.5 and is compatible with these three polymers.

Functional groups capable of generating covalent, ionic, donor-acceptor or hydrogen bonds between the polymers.

The present invention provides functionalized versions of HI-PMS polymers containing functional groups which are capable of chemical interaction with functional groups present in dissimilar polar polymers with which blends are formed, thereby enhancing interfacial adhesion between the molecular chains of each type of polymer and facilitating the development of compatibilized elastomer blends which not only exhibit improved resistance to ozone or oxygen attack and improved heat stability, but also exhibit a retention and in some cases improvement of important physical properties such as tensile strength and heat aging properties.

SUMMARY OF THE INVENTION

This invention provides for novel functionalized copolymers of $C_4$ to $C_7$ isoolefin copolymerized with a para-alkylstyrene and a functionalized para-alkylstyrene and blends thereof. In particular, this invention relates to a functionalized polymer comprising a $C_4$ to $C_7$ isoolefin, a para-alkylstyrene and a para-alkystyrene functionalized with an amine or hydroxy alkyl thio ether.

The functionalized copolymers give rise to compositions and vulcanizates having a good balance of physical and chemical properties and improved heat, ozone and oil resistance. The blends of this invention may be readily compounded, shaped and co-vulcanized into articles such as drive belts, automotive hoses, gaskets, air springs, molded articles and the like which not only exhibit improved heat, ozone and oil resistance but also have retained or enhanced physical properties such as abrasion resistance, modulus, elongation and tensile strength.

DETAILED DESCRIPTION OF THE PREFERRED EMBODIMENTS

In a preferred embodiment, the functionalized copolymer of this invention comprises an isoolefin copolymer comprising one or more monomers represented by the following formulae:

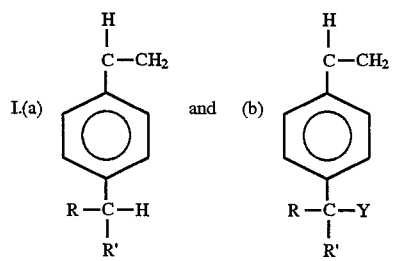

wherein each R and R' are independently hydrogen or lower alkyl and Y is $S-R^2(-OH)_n$, $R^2$ is a hydrocarbyl radical containing 1 to 20 carbon atoms and n is an integer of from 1 to 10 preferably 1 to 4.

This invention also provides for compatibilized blend compositions comprising:

(i) at least one functionalized copolymer comprising a $C_4$ to $C_7$ isoolefin, a para-alkylstyrene and a para-alkylstyrene functionalized with an amine or a hydroxy alkyl thio ether, preferably wherein the para-alkylstyrene and the functionalized para-alkylstyrene are represented by the formulae:

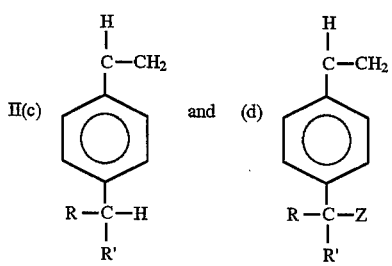

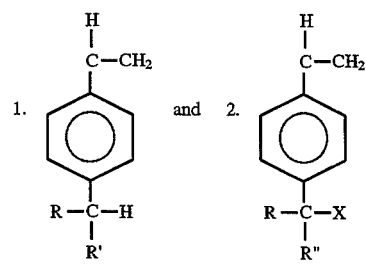

wherein each R and R' is independently hydrogen or lower alkyl, Z comprises a hydroxy-containing functional group, preferably OH, S—$R^2$(—OH)$_n$ or N(H)$_{2-m}$($R^3$OH)$_m$ and mixtures of these with bromine or chlorine atoms, $R^2$ and $R^3$ independently are hydrocarbyl radicals containing 1 to 20 carbon atoms, n is an integers of from 1 to 10, preferrably 1 to 4, and m is 1 or 2, and:

(ii) at least one dissimilar polymer, preferably containing polar groups which are reactive or interactive with said hydroxy-containing functional groups.

The novel functionalized copolymers containing the mixed monomer units set forth in formula I above are prepared by contacting a preformed HI-PMS polymer as described above and as disclosed in U.S. Pat. No. 5,162,445 with a nucleophilic reagent having the formula MS—$R^2$(—OH)$_n$, wherein M a metal ion or an onium ion and $R^2$ and n are as described above, under reaction conditions such that at least a portion or all of the benzylic halide atoms present in the HI-PMS polymer structure are displaced via a nucleophilic substitution reaction and replaced with S—$R_2$(—OH)$_n$ groups. The reaction is preferably conducted in solution using a solvent system which will dissolve the HI-PMS polymer and provide a solution or dispersion of the nucleophilic reagent so as to achieve intimate contact between the benzylic halogen of the base HI-PMS polymer and the nucleophile. Suitable solvents include benzene, toluene, alkanes such as heptane, hexane, and cyclohexane and oxygen-containing solvents or solvent mixtures such as tetrahydrofuran or mixtures thereof with lower alcohols.

The reaction is preferably conducted under mild reaction conditions so as to avoid the formation of crosslinked or gelled products and minimize unwanted side reactions. Preferred reaction temperatures range from about 20 to 100 degrees C. The formation of the desired reaction product is facilitated under mild reaction conditions by utilizing the onium salt of the nucleophilic agent as a reactant, i.e., the tetrabutyl ammonium salt.

The structure and composition of the functionalized HI-PMS polymer will be dictated by the structure and composition of the HI-PMS base polymer and the degree to which the benzylic halogens are displaced by the nucleophilic groups of the nucleophilic reagent. Preferred HI-PMS base polymers may be characterized as isobutylene interpolymers containing from about 10 to about 99.5 mole % of isobutylene, with the balance of the interpolymer containing the monomers represented by the formulae below randomly spaced along the polymer chains:

wherein at least about 5 mole % of the comonomer units (1) and (2) present in the polymer chain are of the structure of formula 2, R and R' are independently hydrogen or $C_1$ to $C_4$ alkyl, R" is independently hydrogen, $C_1$ to $C_4$ alkyl or X, and X is bromine or chlorine, and wherein the interpolymer is otherwise substantially free of any halogen in the polymer backbone chain.

With reference to isobutylene as the isoolefin comonomer, these interpolymers are inclusive of:

a) copolymers consisting of isobutylene and a monomer having the structure of formula 2 wherein R" is hydrogen or $C_1$ to $C_4$ alkyl, e.g., copolymers of isobutylene and a monohalo-substituted para-alkylstyrene;

b) terpolymers comprising isobutylene and a mixture of monomers having the structure of formulas 1 and 2 wherein R" is hydrogen or $C_1$ to $C_4$ alkyl, e.g., terpolymers of isobutylene, a para-alkylstyrene and a monohalo-substituted para-alkylstyrene;

c) terpolymers comprising isobutylene and a mixture of monomers having the structure of formula 2 wherein, with respect to a major proportion of the formula 2 monomer, R" is hydrogen or $C_1$ to $C_4$ alkyl and, with respect to a minor proportion of said formula 2 monomer, R" is X, e.g. bromine or chlorine, such as terpolymers of isobutylene, a mono-halo substituted para-alkylstyrene and a di-halo substituted para-alkylstyrene; and d) tetrapolymers comprising isobutylene and a mixture of monomers having the structure of formulas 1 and 2 wherein, with respect to major proportion of the formula 2 monomer, R" is hydrogen or $C_1$ to $C_4$ alkyl and, with respect to a minor proportion of said formula 2 monomer, R" is bromine or chlorine, e.g., tetrapolymers of isobutylene, a para-alkylstyrene, a monohalo-substituted para-alkylstyrene and a dihalo-substituted para-alkylstyrene.

As stated above, these halogenated interpolymers are prepared using a copolymer of a $C_4$ to $C_7$ isoolefin and a para-alkylstyrene as the halogenation substrate. Interpolymers having the composition (a), (b), (c) or (d) above will be produced as a function of the severity of the halogenation reaction. For example, mild halogenation will tend to yield interpolymers of the characteristics of (b), stronger halogenation will yield interpolymers of the characteristics of (a) or (d) and the strongest halogenation will yield terpolymers having the characteristics of (c).

The most preferred elastomers used in the compositions of the present invention are random elastomeric brominated terpolymers comprising isobutylene and para-methylstyrene (PMS) containing from about 0.5 to about 20 mole % PMS, more preferably from about 2 to about 15 mole % PMS, wherein up to about 60 mole % of the PMS monomer units contain a mono-bromomethyl group. These elastomeric copolymers generally exhibit a number average molecular weight in the range of from about 25,000 to about 500,000, more preferably from about 50,000 to about 250,000. From about 5 up to about 60 mole % of the total PMS monomer content of the terpolymer contains a mono-bromomethyl group with essentially no bromination occurring in the polymer backbone or in the aromatic ring. The bromine content of these terpolymers generally ranges from about 0.1 to about 5 mole %.

The functionalized polymers prepared in accordance with this invention will have essentially the same structure as the HI-PMS base polymer except that at least a portion of the benzylic halogens will be replaced by the nucleophile S—$R^2$(—OH)$_n$ as set forth above. The degree of displacement will be a direct function of the stoichiometric ratio of the molar quantity of nucleophilic reagent and the moles of halogen present in the HI-PMS backbone polymer. Thus, polymers having the structure of formula I above wherein Y is a mixture of the nucleophile and halogen will be obtained wherein less than equimolar quantities of the nucleophilic reactant are employed. Where Y in formula 1 consists essentially of the nucleophile, then equimolar or molar excess of the nucleophilic reactant would be employed in the reaction.

Preferred polymers of this invention are those of formula I wherein at least 50% by weight of the Y groups contain the nucleophile, more preferably wherein essentially 100% by weight of the groups are the nucleophile. Such polymers would contain from about 0.05 up to about 5 mole % of the Y group, wherein from about 50 to 100% by weight of said Y group constituted the nucleophile, e.g. S—$R^2$(—OH)$_n$ and from 0 to about 50% by weight of the Y group constituted halogen, e.g. bromine.

Nucleophilic reagents which may be employed to prepare the functional polymers of Structure I above are mercaptoalcohols and their salts having formula MS—$R^2$(—OH)$_n$ wherein M is hydrogen, a metal ion or an onium ion, R2 is a hydrocarbyl radical containing 1–20 carbon atoms, more preferably from 2 to 6 carbon atoms, and n is an integer of from 1 to 10. Preferred nucleophilic reagents are those where M is an onium cation such as tetrabutyl (Bu4) ammonium, n is 1 or 2 and R2 contains 2 or 3 carbon atoms, such as tetrabutyl ammonium (2-hydroxyethyl) thiolate or tetrabutyl ammonium (1,2-dihydroxypropyl) thiolate.

As indicated above, the present invention also provides for compatibilized blends of hydroxy-functional isoolefin/para-alkylstyrene copolymers containing a monomer mixture having the structure of Formula II above and at least one dissimilar polymer containing polar groups which are reactive or interactive with said hydroxy-containing functional groups. The term "reactive with" is intended to encompass polar groups which form covalent or ionic chemical bonds with the hydroxy-functional isoolefin copolymers; the term "interactive with" is intended to encompass polar groups which form hydrogen bonds or impart improved miscibility with the hydroxy-functional isoolefin copolymer. Inclusive of such hydroxy-functional isoolefin copolymers are those prepared in accordance with Examples 1–3, i.e., copolymers having a monomer mixture having the structure of Formula II wherein Z is S—$R^2$(OH)$_n$ as well as other copolymers wherein Z is OH or $N(H)_{2-m}((R^3)OH)_m$. In this embodiment, the copolymers are most preferably elastomers containing isobutylene copolymerized with from about 0.5 to 20 mole % of para-methylstyrene (PMS) comonomer wherein from about 5 up to about 60 mole % of the PMS monomer units contain Z functionality.

Copolymers wherein Z in Formula II is OH may be prepared by reacting HI-PMS with a monocarboxylic acid salt such as sodium acetate in the presence of BU$_4$NOH (phase transfer catalyst) to replace benzylic halogen with an ester functionality, followed by hydrolysis to produce the alcohol. This material and its method for production is disclosed in Example 113 of U.S. Pat. No. 5,162,445, incorporated herein by reference.

Copolymers wherein Z in Formula II is $N(H)_{2-m}((R^3)OH)_m$ may be prepared by a similar nucleophilic substitution reaction using a mono-or dialkanol amine as the nucleophilic reagent, such as ethanolamine or diethanolamine. This material is also disclosed in U.S. Pat. No. 5,162,445. A suitable procedure for preparing such a copolymer described in Example 6.

Dissimilar polymers with which the functionalized HI-PMS copolymers may be blended include polymers containing halide or carboxyl functionality in the polymer backbone. Halogen-containing polymers include polychloroprene, halogenated butyl rubber, polyvinyl or polyvinylidene chloride, chlorinated and chlorosulfonated polyethylene and similar materials. Polymers containing carboxylic functionality include carboxylated polymers and copolymers of butadiene such as a carboxylated copolymer of butadiene and acrylonitrile, polyamides, polyesters, copolymers of ethylene with acrylic and/or methacrylic monomers and olefin polymers containing grafted acid functionality such as maleated polyethylene, maleated copolymers of ethylene and propylene and maleated terpolymers of ethylene, propylene and a non-conjugated diene.

The invention is especially applicable to vulcanizable blends based on a mixture of functionalized HI-PMS elastomer and polychloroprene and/or carboxyl nitrile rubber because it is with respect to these materials that there exists the greatest need to balance their inherently good oil resistance and adhesive properties with improved ozone resistance and enhanced heat stability inherent in HI-PMS elastomers.

The polychloroprene elastomer used in the elastomer blend in one embodiment of the present invention is a commercially available material, commonly referred to as CR or neoprene rubber. It is available in a number of grades and molecular weights, all of which elastomeric grades are suitable for use in compositions of this invention. The preferred grade is Neoprene GRT which is more resistant to crystallization and is based on a copolymer of chloroprene and 2,3-dichloro-1,3-butadiene. Neoprene synthesis is also well known in the art. C. A. Hargraves et al., Encyclopedia of Polymer Science and Technology, vol. 3, p. 705–730.

The carboxyl nitrile rubber used in the elastomer blend in another embodiment of this invention is also a commercial material available in a number of grades. Nitrile rubber is a random copolymer of a major proportion of butadiene and minor proportion of acrylonitrile and is generally produced by free radical catalysis. An especially preferred carboxyl nitrile rubber is available from B. F. Goodrich under the trade name HYCAR 1072CG.

Although not wishing to be bound by any particular theory, it is believed that compatibilization of the polar elastomer and functionalized HI-PMS elastomer occurs, in the case of halogen containing elastomers, by the formation of ether linkages by replacement of allylic halogen, e.g. chlorine, and in the case of elastomers containing a carboxylic functionality, by the formation of ester linkages with the hydroxy function of the HI-PMS polymer. In the latter case, compatibilization can be further enhanced by the inclusion of catalytic amounts of a suitable esterification catalyst such as tin octanoate.

The functionalized HI-PMS may be present in the composition in the broad range of from about 1 to about 95% by weight, preferably 1 to 50 wt. %, even more preferable, 5–20 wt. % of functionalized HI-PMS and correspondingly about 99 to 5% by weight, preferably 99 to 50 wt. %, even more preferably 95 to 80 wt. % of one or a mixture of dissimilar elastomer(s), based on the total elastomer content of the composition.

The vulcanizable composition of the present invention may also include conventional mixed vulcanizing systems which are known curatives for HI-PMS rubber and the particular dissimilar polar elastomer present in the blend. Generally such vulcanizing systems may include a metal oxide such as zinc oxide, magnesium oxide and mixtures thereof, used either alone or mixed with one or more organic accelerators or supplemental curing agents such as an amine, a phenolic compound, a sulfonamide, thiazole, a thiuram compound, thiourea or sulfur. Organic peroxides may also be used as curing agents. The zinc or magnesium oxide is normally present at a level of from about 1 to about 10 parts by weight per 100 parts by weight of elastomer blend, and the sulfur and supplemental curing agents or curing accelerators, where used, may be present at a level of from about 0.1 to about 5 parts by weight per 100 parts by weight of the elastomer blend. The elastomer polymer composition may also contain other additives such as lubricants, fillers, plasticizers, tackifiers, coloring agents, blowing agents, and antioxidants.

Examples of fillers include inorganic fillers such as carbon black, silica, calcium carbonate, talc and clay, and organic fillers such as high-styrene resin, coumarone-indene resin, phenolic resin, lignin, modified melamine resins and petroleum resins.

Examples of lubricants include petroleum-type lubricants such as oils, paraffins, and liquid paraffins, coal tar-type lubricants such as coal tar and coal tar pitch; fatty oil-type lubricants such as castor oil, linseed oil, rapeseed oil and coconut oil; tall oil; waxes such as beeswax, carnauba wax and lanolin; fatty acids and fatty acid salts such as licinoleic acid, palmitic acid, barium stearate, calcium stearate and zinc laurate; and synthetic polymeric substances such as petroleum resins.

Examples of plasticizers include hydrocarbon oils, e.g., paraffin, aromatic and napththenic oils, phthalic acid esters, adipic acid esters, sebacic acid esters and phosphoric acid-type plasticizers.

Examples of tackifiers are petroleum resins, coumarone-indene resins, terpene-phenol resins, and xylene/formaldehyde resins.

Examples of coloring agents are inorganic and organic pigments.

Examples of blowing agents are sodium bicarbonate, ammonium carbonate, N,N'-dinitrosopentamethylenetetramine, azocarbonamide, azobisisobutyronitrile, benzenesulfonyl hydrazide, toluenesulfonyl hydrazide, calcium amide, p-toluenesulfonyl azide, salicylic acid, phthalic acid and urea.

The vulcanizable composition may be prepared and blended using any suitable mixing device such as an internal mixer (Brabender Plasticorder), a Banbury Mixer, a kneader or a similar mixing device. Blending temperatures and times may range from about 45 to 180 degrees C. and 4 to 10 minutes respectively. After forming a homogeneous mixture of the elastomers and optional fillers, processing aids, antioxidants and the like, the mixture is then vulcanized by the further mixing-in of crosslinking agents and accelerators followed by heating the resulting blend to a temperature of from about 100 to 250 degrees C., more preferably from about 125 to 200 degrees C. for a period of time ranging from about 1 to 60 minutes. Molded articles such as belts and hoses are prepared by shaping the prevulcanized formulation using an extruder or a mold, and subjecting the composition to temperatures and curing times as set forth above.

The following examples are illustrative of the preparation of two preferred functionalized HI-PMS elastomer copolymers in accordance with this invention.

EXAMPLE 1

This example details the preparation of polyisobutylene-co-[4-(2-hydroxyethyl)-thiomethyl styrene] using, as a base polymer, a brominated copolymer of isobutylene and 5 wt % para-methylstyrene, containing 0.48 mole percent of brominated para-methylstyrene and containing 5.25 m mole of bromine and having a number average molecular weight of 600K.

A jacketed resin bottle (1L, 3-neck) equipped with a thermometer, mechanical stirrer and a condenser with $N_2$ bubbler outlet was charged with 50 grams of dried brominated isobutylene-para-methylstyrene copolymer referred to above (designated BRI-PMS) and 500 grams of tetrahydrofuran solvent (THF). This mixture was stirred under $N_2$ and heated to 55 degrees C. to dissolve the polymer completely—about 6 hours. 1.68 grams of tetrabutyl ammonium (2-hydroxy ethyl) thiolate (T BAT) salt (5.25 m mol) dissolved in 20 grams of a mixture of THF and methanol was then added to the reaction mixture with continuous stirring under the same conditions for one hour. The reaction mixture was then poured out and coagulated using excess isopropanol containing 0.1% by weight 2,6-di-tert-4-methylphenol (BHT) antioxidant. The coagulant was again kneaded in a fresh two volume portion of the above alcohol mixture and was dried under vacuum (−32 "Hg) at 55 degrees C. for 48 hours.

Spectroscopic $^1$HNMR analysis of the product, referred to as MEI-PMS revealed that essentially 100% of the original benzylic bromine had been replaced by the —S—$(CH_2)_2$—OH nucleophile.

EXAMPLE 2

Example 1 was repeated except that the base BRI-PMS polymer used was a copolymer of isobutylene and 7.5 wt % PMS, containing 1.14 mole % brominated PMS and containing 12.5 m mole of bromine and having a number average molecular weight of 470K, and 12.5 m mole of TBAT salt was reacted.

Spectroscopic $^1$HNMR analysis showed that essentially 100% of the original benzylic bromine had been replaced by the —S—$(CH_2)_2$—OH nucleophile.

EXAMPLE 3

Example 2 was repeated except that only 6.25 m mole of TBAT salt was added to the reaction medium.

Spectroscopic $^1$HNMR analysis showed that only about 50% of the original benzylic bromine atoms were replaced, leaving a mixed polymer containing about 50% of original benzylic bromine and 50% of benzylic —S—$CH_2)_2$—OH groups.

EXAMPLE 4

This example demonstrates the preparation of polyisobutylene-co-[4-(1,2-dihydroxy-n-propyl-thiomethyl styrene)].

50 grams of BRI-PMS base polymer of Example 2 was dissolved in THF as set forth in Example 1. 4.37 grams of tetrabutyl ammonium (1,2-dihydroxy-n-propyl) thiolate (TBADT) salt (12.5 mmol) dissolved in THF and methanol was added and the mixture heated at 55 degrees C. for one hour. The reaction product was coagulated and recovered as in Example 1.

Spectroscopic $^1$HNMR analysis of the product, referred to as MPGI-PMS, showed that essentially 100% of the original benzylic bromine atoms were replaced by the —S—CH$_2$—CH(OH)—CH$_2$OH nucleophile.

EXAMPLE 5

Example 4 was repeated except that only 6.25 m mole of TBADT salt was added to the reaction medium.

Spectroscopic $^1$HNMR analysis showed that the product contained about 50% of the original benzylic bromine and about 50% of benzylic —S—CH$_2$—CH(OH)—CH$_2$OH groups.

EXAMPLE 6

500 g of isobutylene/p-methylstyrene/p-bromomethylstyrene copolymer (1.7 mole % p-methylstyrene, 0.7 mole % p-bromomethylstyrene, 30 ML at 125 degrees C.) was dissolved in 2267 g of toluene in a 5-liter resin flask under nitrogen to form an 18 wt. % solution. Then 24.6 diethanolamine (Aldrich, 99%) in 567 g of isopropanol was added slowly with stirring at room temperature to give a 14.9 wt. % polymer solution in an 80/20 (weight/weight) toluene/isopropanol solvent blend. The solution was heated with stirring under nitrogen to reflux at about 87 degrees C. for 3 hours before being allowed to cool. The polymer was recovered by precipitation and kneading in isopropanol. The recovered "wet" polymer was further purified by washing and kneading in a 50/50, water/methanol mixture to complete the removal of unreacted diethanolamine and then vacuum-oven dried at 70 degrees C. for 48 hours with 0.2 wt. % BHT mixed as an antioxidant. The polymer was characterized by 'H NMR and showed the complete conversion of p-bromomethyl to diethanolaminomethyl functionality (0.7 mole % DEA).

The materials used in the examples described below were as follows:

A. Neoprene GRT is a polychloroprene elastomer marketed by DuPont;

B. NBR-COOH is a copolymer of butadiene and acrylonitrile containing acrylic acid carboxylic functionality marketed by B. F. Goodrich under the tradename HYCAR 1072CG.

EXAMPLES 7–9

Blends having the composition shown in Table 1 (parts by weight) were prepared by mixing the components in a small scale (45 cc) Brabender mixer at a temperature of 110 degrees C. for a period of 5 minutes. The blend of Example 9 also contained 0.4 parts by weight of tin octanoate catalyst. These blend samples were then examined in an optical microscope as thin sections (100–200 nm) using phase contrast such that NBR phase appears black and the functionalized HI-PMS phase appears a greyish-white.

TABLE 1

| BLEND | NBR | NBR—COOH | BRI—PMS | MEI—PMS |
|---|---|---|---|---|
| Ex 7 | 70 | — | 30 | — |
| Ex 8 | — | 70 | — | 30 |
| Ex 9 | — | 70 | — | 30 + catalyst |

The BRI-PMS component used in the blend of Example 7 is a brominated copolymer of isobutylene and para-methylstyrene containing 5 wt. % para-methylstyrene, 0.8 wt. % bromine and having a Mooney Viscosity of 55. The MEI-PMS component used in the blends of Examples 8 and 9 is the polyisobutylene-co[4-(2-hydroxyethyl)-thiomethyl styrene] produced in accordance with Example 1 wherein about 100% of the original bromine content has been replaced by 2-hydroxyethyl thioether functional groups.

Microscopic examination showed that the MEI-PMS polymer phase in Examples 8 and 9 was much more finely and uniformly dispersed in the NBR-COOH matrix phase as compared with control blend of Example 7. The MEI-PMS phase in Examples 8 and 9 appears as uniformly dispersed small particles or fibrils having a dimension of less than 25 microns with most particles being less than 10 microns. In the control of Example 7, the BRI-PMS phase appeared as poorly dispersed, long fibrils or islands having a dimension in excess of 10 microns, mostly in excess of 50 microns.

In the following examples, vulcanizable compositions were prepared containing the components set forth in Tables 2–4 with respect to formulations based on polychloroprene (PC) and nitrile rubber (NBR or NBR-COOH) the vulcanization recipe was of the following composition:

| Components | PC BLENDS | NBR—NBR—COOH BLENDS |
|---|---|---|
| Polymer | 45 g (100 phr) | 45 g (100 phr) |
| Stearic Acid | 0.565 g (1.25 phr) | 0.225 g (0.5 phr) |
| Octamine | 0.45 g (1.0 phr) | 0.45 g (1.0 phr) |
| Wingstay 29 Disp. | 0.32 g (0.715 phr) | 0.32 g (0.715 phr) |
| Wingstay 100 Az | 0.565 g (1.25 phr) | 0.565 g (1.25 phr) |
| Aranox | 0.225 g (0.50 phr) | 0.225 g (0.5 phr) |
| Zno (Kadox 911) | 1.125 g (2.5 phr) | 1.125 g (2.5 phr) |
| MBTS | — | 0.90 g (2.0 phr) |
| TMTDS | 0.225 g (0.5 phr) | 0.675 g (1.5 phr) |
| DOTG | 0.16 g (0.35 phr) | — — |
| Santoguard PV1 | 0.135 g (0.30 phr) | — — |
| MgO (Maglite D) | 0.90 g (2.0 phr) | — — |

The compounding ingredients identified by product name above are as follows:

| Octamine | C8-amine; reaction product of diphenylamine and diisobutylene (Uniroyal Chemical Co., Naugatuck, CT) |
|---|---|
| Wingstay 29 | disp. - styrenated diphenylamine |
| Wingstay 100 Az | Mixed diaryl-p-phenylenediamine (Good Year Rubber Co., Akron, OH) |
| Aranox | p-(polysulfarylamido) diphenylamine (Uniroyal Chemical Co., Naugatuck, CT) |
| MBTS | 2,2'-dibenzothiazyl disulfide (R.T. Vanderbilt Co., Norwalk, CT) |
| TMTDS | Tetramethyl thiuram disulfide (Uniroyal Chemical Co., Naugatuck, CT) |
| DOTG | Diorthotolylguanidine (American Cyanamid Co., Boundbrook, NJ) |
| Santoguard | PVI N-cyclohexylthiophthalimide (Monsanto Chemical Co., St. Louis, MO) |

Curable compositions were prepared by first mixing stearic acid and octamine with the polymers in a small scale (60 cc) C. W. Brabender at 110 to 140 degrees C. (PC blends at 110 degrees C.; nitrile blends at 140 degrees C.), 60 rpm for 5 min. The blend samples were removed, cooled under nitrogen and the rest of the ingredients were mixed at 50 degrees C., 50 rpm for 5 min. The blend samples were then cured at 160 degrees C. for 20 minutes to fabricate test specimens (tensile dumbbels, etc.) which were tested after a 24 hour waiting period. Mechanical properties, heat aging, and dynamic ozone resistance were measured using standard (ASTM) conditions.

These polymer blends were also examined in an optical microscope as described above prior to compounding with the vulcanization recipe.

EXAMPLES 10–12

Polymer blends having the composition of Table 2 were formulated, compounded with the PC cure recipe set forth above and cured as set forth above.

TABLE 2

| | EX. 10 | EX. 11 | EX. 12 |
|---|---|---|---|
| Blend component/properties | | | |
| PC (Neoprene) | 100 | 67 | 67 |
| BRI—PMS | — | 33 | — |
| MEI—PMS | — | — | 33 |
| Physical Properties | | | |
| Cure 20 Min. 160 degrees C.[1] | | | |
| Tensile MPA | 11.9 | 9.5 | 9.0 |
| Elongation % | 1037 | 727 | 1093 |
| Heated Aged 96 Hr. 140 degrees C.[2] | | | |
| Tensile | 4.8 | 4.9 | 6.0 |
| Elongation % | 292 | 258 | 426 |
| Dynamic Ozone Resistance[3] | 120 | >148 | >336 |
| 100 ppm O3 37.8° C. 30 Cycle/Min. | | | |
| Hr. to Crack | | | |

Note
[1] ASTM D-3182-89
[2] ASTM D-573
[3] ASTM D-3395-86 (METHOD A)

Microscopic comparisons of thin (100–200 nm) sections of the elastomer blend showed that the morphology of the BRI-PMS phase of Example 11 was almost co-continuous with the PC phase whereas the MEI-PMS phase of Example 12 was dispersed within the PC phase with most dispersed particles having a size of less than 10 microns. In addition, the data in Table 2 shows a significant improvement in heat aging and ozone resistance for the cured formulation of Example 12 when compared with the straight PC formulation of Example 10 and the PC/BRI-PMS formulation of Example 11.

EXAMPLES 13–15

Three additional formulations having the composition of Table 3 were prepared, formulated and cured as in Examples 10–12 except in these examples the component designated MPGI-PMS is the polyisobutylene-co-[4-(1,2-dihydroxy-n-propylthiomethyl styrene)] as prepared in Example 4.

TABLE 3

| | Ex. 13 | Ex. 14 | Ex. 15 |
|---|---|---|---|
| Blend component properties | | | |
| PC (Neoprene) | 100 | 67 | 67 |
| BRI—PMS | — | 33 | — |
| MPGI—PMS | — | — | 33 |
| Physical properties | | | |
| Cure 20 Min. 160 degrees C. | | | |
| Tensile MPa | 11.9 | 9.5 | 12.6 |
| Elongation | 1037 | 727 | 935 |
| Heated Aged 96 hr. 140 degrees C. | | | |
| Tensile | 4.8 | 4.9 | 5.4 |
| Elongation % | 292 | 258 | 336 |

TABLE 3-continued

| | Ex. 13 | Ex. 14 | Ex. 15 |
|---|---|---|---|
| Dynamic Ozone Resistance | 120 | >148 | >336 |
| 100 ppm O3 37.8 degrees C. | | | |
| 30 cycle/min. | | | |
| Hr. to crack | | | |

As in the case of Examples 10–12 above, microscopic examination showed that the BRI-PMS phase of Example 14 was present almost co-continuous with the PC phase wherein the MPGI-PMS phase of Example 15 was dispersed within the PC phase, with most dispersed particles having a diameter of less than 10–15 microns. Also, the physical and mechanical property data of Table 3 shows an enhancement of tensile strength, heat aging and dynamic ozone resistance for the formulation of Example 15 as compared with the formulations of Examples 13 and 14.

EXAMPLES 16–19

Four additional formulations having the composition of Table 4 were prepared, formulated and cured as in Examples 10–12 except in these examples the component designated DEAI-PMS was the reaction product of BRI-PMS and diethanolamine as prepared in Example 6.

TABLE 4

| | EX. 16 | EX. 17 | EX. 18 | EX. 19 |
|---|---|---|---|---|
| Blend component/properties | | | | |
| NBr | 70 | — | — | — |
| NBR—COOH | — | 70 | 70 | 70 |
| BRI—PMS | 30 | 30 | — | 20 |
| DEAI—PMS | — | — | 30 | 10 |
| Physical Properties Cure | | | | |
| 20 Min. 160 degrees C. | | | | |
| Tensile MPa | 3.1 | 4.6 | 8.3 | 6.3 |
| Elongation % | 547 | 574 | 610 | 624 |
| Heat Aged, 48 Hr. 140 degrees C. | | | | |
| Tensile MPa | 3.1 | 5.7 | 13.9 | 12.7 |
| Elongation % | 506 | 227 | 296 | 270 |
| Dynamic Ozone Resistance | 48 | 96 | 192 | 270 |
| 100 ppm O3, 37.8 degrees C., | | | | |
| 30 Cycle/Min. | | | | |
| Hr. To crack | | | | |

Microscopic comparison of the blends of Examples 16 (control) and 18 showed a very poor dispersion of the BRI-PMS phase in NBR in Example 16 and a much better dispersion of the DEAI-PMS phase in NBR-COOH in Example 18, with most particles having a dimension of less than 10 microns. The beneficial effects of compatibilization are demonstrated by enhanced tensile properties, heat aging and ozone resistance of the Example 18 and Example 19 blends compared to the control blend of Example 16.

As is apparent from the foregoing description, the materials prepared and the procedures followed relate to specific preferred embodiments of the broad invention. It is apparent from the foregoing general description and the specific embodiments that, while forms of the invention have been illustrated and described, various modifications can be made without departing from the spirit and scope of this invention. Accordingly, it is not intended that the invention be limited thereby.

I claim:

1. A method for producing a compatibilized rubber composition comprising:

blending (i) at least one polymer comprising an isoolefin having from 4–7 carbon atoms, and para-alkylstyrene monomers represented by the formulae:

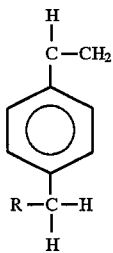 (c)

and

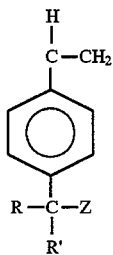 (d)

wherein each R and R' are independently hydrogen or a lower alkyl, Z is a halogen or S—$R_2(OH)_n$, $R^2$ is a hydrocarbyl radical containing 1 to 6 carbon atoms, and n is an integer of from 1 to 10; with (ii) at least one dissimilar rubber containing halide or carboxyl functionality in the polymer backbone.

2. The method of claim 1, wherein the para-alkyl-styrenes are both para-methyl-styrenes.

3. The process of claim 1 wherein the dissimilar polymer is one or more members selected from the group consisting of: polychloroprene, halogenated butyl rubber, polyvinyl chloride, polyvinylidene chloride, chlorinated polyethylene, chlorosulfonated polyethylene a carboxylated copolymer of butadiene and acrylonitrile, polyamide, polyester, a copolymer of ethylene with acrylic and/or methacrylic monomers, and an olefin polymer containing grafted acid functionality.

4. The process of claim 3 wherein olefin polymer containing grafted acid functionality is one or more members selected from the group consisting of: maleated polyethylene, maleated ethylene/propylene copolymers, and maleated ethylene/propylene/non-conjugated diene terpolymers.

5. The process of claim 1 wherein at least 50 weight percent of the Z groups contain the hydroxy-containing functional group.

* * * * *